US010757775B2

(12) United States Patent
Modepalli et al.

(10) Patent No.: US 10,757,775 B2
(45) Date of Patent: Aug. 25, 2020

(54) N-COLOR SCALABLE LED DRIVER

(71) Applicant: RENSSELAER POLYTECHNIC INSTITUTE, Troy, NY (US)

(72) Inventors: Kumar Modepalli, Milpitas, CA (US); Leila Parsa, Cohoes, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 16/460,329

(22) Filed: Jul. 2, 2019

(65) Prior Publication Data
US 2019/0327813 A1 Oct. 24, 2019

Related U.S. Application Data

(63) Continuation of application No. 15/504,561, filed as application No. PCT/US2015/048595 on Sep. 4, 2015, now Pat. No. 10,390,406.

(60) Provisional application No. 62/046,108, filed on Sep. 4, 2014.

(51) Int. Cl.
*H05B 45/10* (2020.01)
*H05B 45/20* (2020.01)
*G09G 3/34* (2006.01)
*H05B 45/22* (2020.01)
*H05B 45/24* (2020.01)
*H05B 45/37* (2020.01)
*H05B 45/46* (2020.01)
*H05B 47/11* (2020.01)

(52) U.S. Cl.
CPC .......... *H05B 45/20* (2020.01); *G09G 3/3413* (2013.01); *H05B 45/22* (2020.01); *H05B 45/24* (2020.01); *H05B 45/37* (2020.01); *H05B 45/46* (2020.01); *H05B 47/11* (2020.01); *G09G 2320/064* (2013.01)

(58) Field of Classification Search
CPC .......................... H05B 37/02; H05B 37/0218; H05B 37/0227; H05B 33/08; H05B 33/0815; H05B 33/0845; H05B 33/0857; H05B 33/0866; H05B 33/0869; G09G 3/3413; G09G 2320/064
See application file for complete search history.

(56) References Cited

U.S. PATENT DOCUMENTS 9,144,131 B2 * 9/2015 Wray .................. H05B 45/40
2012/0025722 A1 * 2/2012 Mokry ............... H05B 33/0815
315/187

* cited by examiner

*Primary Examiner* — Jimmy T Vu
(74) *Attorney, Agent, or Firm* — Murtha Cullina LLP; Anthony P. Gangemi

(57) ABSTRACT

Light-emitting diode (LED) driver systems that are scalable and can be used for N-color LED systems are provided. An LED system having N LED strings of different color can be efficiently driven with independently controllable constant current sources for each string from a single power source. The driver system can include a power converter having an inductor.

13 Claims, 14 Drawing Sheets

N-COLOR SCALABLE LED DRIVER

CROSS REFERENCE TO RELATED APPLICATION(S)

This application is a continuation of U.S. patent application Ser. No. 15/504,561, filed Feb. 16, 2017, which is a national stage patent filing of International Patent Application No. PCT/US2015/048595, filed Sep. 4, 2017, which claims the benefit of U.S. Provisional Application Nos. 62/046,108, filed Sep. 4, 2014, which are incorporated by reference as if disclosed herein in their entirety.

STATEMENT REGARDING FEDERALLY SPONSORED RESEARCH OR DEVELOPMENT

This invention was made with government support under NSF Contract No. EEC-0812056 and support under NYSTAR Contract No. C090145. The government has certain rights in the invention.

BACKGROUND

Light-emitting diodes (LEDs) of different color have different forward voltages as they require different excitation to produce light output. Therefore, LED strings of different color can't be driven with a single direct current (DC) or alternating current (AC) bus voltage. Also, due to the non-linear I-V (current-voltage) characteristics and negative temperature coefficient, LEDs have to be driven with constant current sources.

Traditionally, LED lighting systems use either single- or multiple-string phosphor-converted white LEDs to deliver the desired lumen level. The phosphor-converted white LED lighting systems with multiple LED strings may have different forward voltages due to temperature variations, non-linear characteristics of LEDs, and poor binning in LED manufacturing. LED drivers that drive multiple LED strings from a single voltage or current source require current balancing mechanisms for constant current regulation in each LED string. Passive and active approaches have been used to counteract voltage mismatch in LED strings and to provide constant currents.

The passive approaches are based on using passive elements, such as capacitors, transformers, and inductors, in different configurations. Capacitor-based current balancing mechanisms underutilize the LEDs and also depend on the tolerance of the capacitances used. Transformer and inductor passive approaches are bulkier in size.

The active balancing approaches are either based on using conventional linear current regulators, such as current mirrors, or by using individual power converters to drive each of the LED strings. In the case of linear current regulators, the efficiency of the converter decreases with the increase in the voltage mismatch between the LED strings. Individual switched mode regulators providing constant current to each LED string are more efficient but are not cost effective due to their higher component count.

BRIEF SUMMARY

Embodiments of the subject invention provide advantageous light-emitting diode (LED) driver systems, as well as methods of fabricating the same, methods of using the same to drive LED systems, and control scheme methods for controlling LED systems. Systems of the subject invention are scalable and can be used for N-color LED systems (where N is an integer such as an integer greater than one). An LED system having N LED strings, wherein at least two of the strings are for an LED of a different color than each other, can be efficiently driven with independently controllable constant current sources for each string from a single power source. For example, all LED strings can be of a different color than all other LED strings. The driver system can include a power converter, such as an AC-DC converter or a DC-DC converter. The power converter can include at least one inductor, and in an embodiment, the power converter can include exactly one inductor. Systems of the subject invention can allow for highly efficient, high-power-density multi-color LED systems to be designed at a reasonable cost.

In an embodiment, an N-color scalable LED driving system can include: a power converter comprising an inductor and configured to provide a DC output; a control circuit configured to receive input signals and provide output control signals to the power converter; and a load connected to the power converter and receiving the DC output from the power converter. The load can include a first LED string for a first LED of a first color and a second LED string for a second LED of a second color different from the first color. The first LED can be a higher-voltage LED than is the second LED, and the second LED string can include a switch in series with the second LED.

DETAILED DESCRIPTION

Figure 1A:
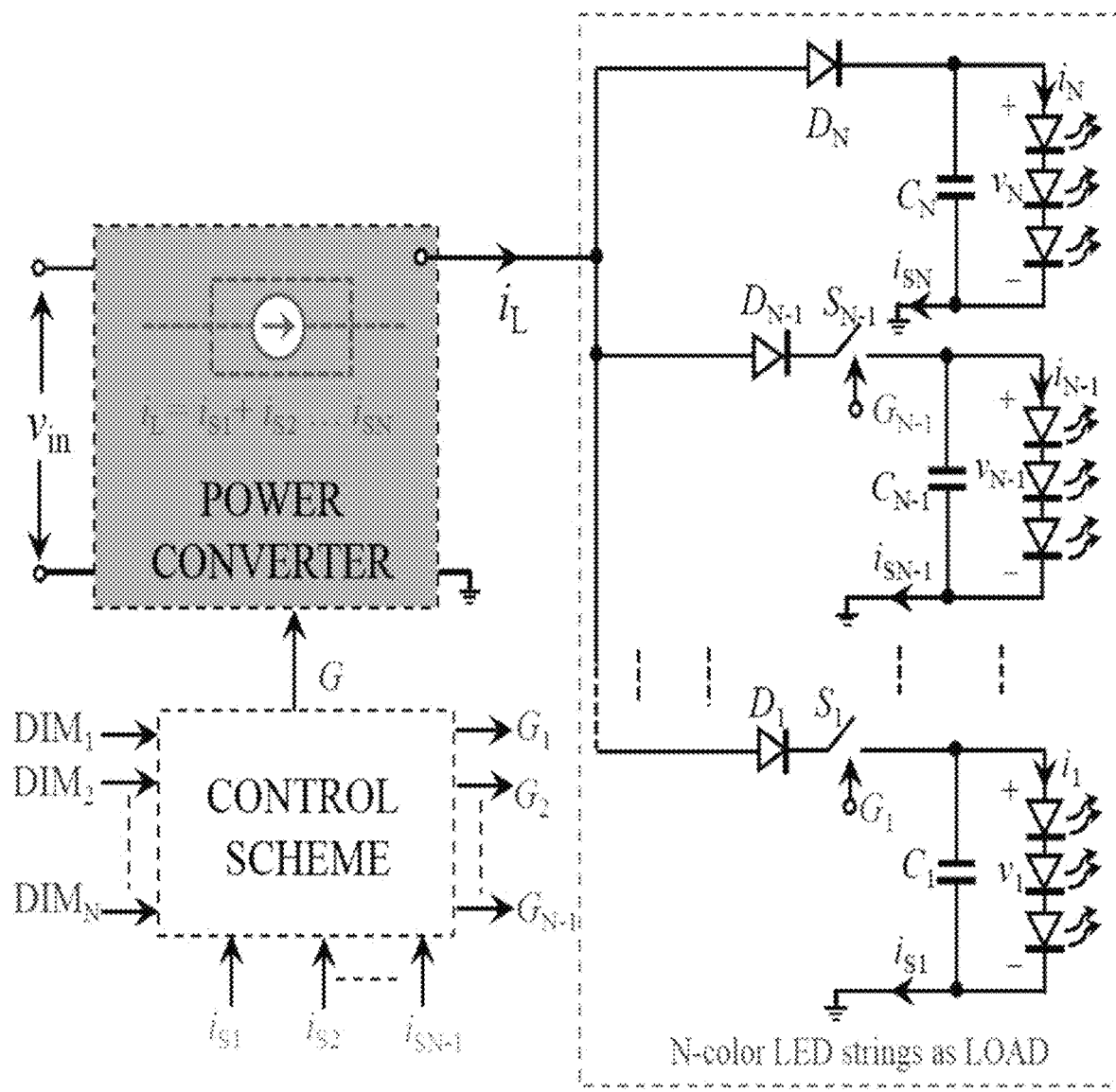
FIG. 1A shows a block diagram of a light-emitting diode (LED) driver system according to an embodiment of the subject invention.

Embodiments of the subject invention provide advantageous light-emitting diode (LED) driver systems, as well as methods of fabricating the same, methods of using the same to drive LED systems, and control scheme methods for controlling LED systems. Systems of the subject invention are scalable and can be used for N-color LED systems (where N is an integer such as an integer greater than one). An LED system having N LED strings, wherein at least two of the strings are for an LED of a different color than each other, can be efficiently driven with independently controllable constant current sources for each string from a single power source. For example, all LED strings can be of a different color than all other LED strings. The driver system can include a power converter, such as an AC-DC converter or a DC-DC converter. The power converter can include at least one inductor, and in an embodiment, the power converter can include exactly one inductor. Systems of the subject invention can allow for highly efficient, high-power-density multi-color LED systems to be designed at a reasonable cost. Due to its simplicity, the entire control scheme is suitable for integrated circuit (IC) implementation.

Similar to multi-string phosphor-converted white LED lighting systems, multi-color LED lighting systems also have different forward voltages, as they require different excitation energy levels for the generation of different color light. Unlike multi-color LED systems, the phosphor-converted white LED systems cannot be controlled dynamically to provide a desired color temperature (CT). Therefore, multi-color LED systems are preferable to phosphor-converted white LED lighting systems for future lighting applications. Future LED drivers for these systems should be capable of providing constant current to each color LED string and should have the ability to independently control the current in each string through dimming techniques, such as pulse-width modulation (PWM) dimming and/or analog dimming, to achieve a desired color point in a CIE (International Commission on Illumination) chromaticity diagram. Moreover, the LED driver should be scalable and modular with simple control. Techniques that can provide both current balancing and independent current control can be used to realize multi-color LED drivers. Embodiments of the subject invention provide active current balancing schemes that can result in high-power-density multi-color LED systems using simple, modular, and scalable control schemes to independently control currents of N strings (where N is an integer, such as an integer greater than one). This can be accomplished using a single power converter.

N-color LED strings (where N is an integer, such as an integer greater than one) inherently have different string voltages. Typically, when connected in parallel to a single current source/voltage source, only the string with the lowest voltage will produce light output. Embodiments of the subject invention provide for a constant current source equivalent to the sum of currents desired by N-color LED strings to be generated from a single source. An alternating current-direct current (AC-DC) or direct current-direct current (DC-DC) power converter can be used and can operate at a switching frequency ($f_s$).

The N-color LED strings can be connected in parallel as a load to the AC-DC or DC-DC power converter and can be supplied by a single current source. If no control is present, then only the string with the lowest voltage would produce light output. However, at least one of the LED strings can have a switch. In an embodiment, each color LED string, except the string with the highest voltage, can have a switch. These switches can be in series with the LED strings, respectively. These switches (e.g., switches in quantity of N−1, where N is the number of LED strings) can be switched ON/OFF (or potentially not switched, depending on the circumstances) in each switching cycle. This can be done through the use of a novel and advantageous modular feedback control scheme, which can lead to providing N constant current sources.

In many embodiments, a control scheme or method used to control the switches can include measuring individual switch currents of the switches (e.g., a quantity of N−1 switches) and integrating these during every switching cycle ($T_s$). A switching cycle can be, for example, the inverse of the switching frequency ($T_s=1/f_s$). The integrated switch currents, which can be equal to the average current in an LED string, can be compared with the desired constant current (i.e., a reference value). This comparison can be accomplished using, e.g., a comparator. Based on the comparison (e.g., the output(s) of the comparator), the switches (e.g., a quantity of N−1 switches) can be switched ON/OFF (on or off; or potentially not switched, depending on the circumstances) to produce a constant current in each string. By varying the reference current with dimming techniques, such as pulse-width modulation (PWM) diming and/or analog dimming, the current in each string can be controlled independently.

In an embodiment, the control scheme can be such that all switches (e.g., a quantity of N−1 switches) are initially kept ON (i.e., closed) at the beginning of each switching cycle (TO. Even with all switches kept in the ON state, the current will only flow in the LED string with the lowest voltage, and the currents in the other strings will be zero (or approximately zero). Once the integrated current in the lowest voltage string reaches a desired reference value (e.g., a predetermined reference value), the switch in the respective LED string can be switched OFF (i.e., open). This sequence can be followed for all switches present (e.g., all LED strings except for the string with the highest voltage, which can be a quantity of N−1 LED strings). Thus, a desired average current can be provided to LED strings (e.g., all LED strings except for the string with the highest voltage, which can be a quantity of N−1 LED strings). The power converter can produce a constant current source equal to the sum of the desired currents in all strings (e.g., N strings). As the currents in the strings other than that with the highest voltage (e.g., a quantity of N−1 LED strings) can be being regulated individually as discussed, the current of the string with the highest voltage (e.g., the N.sup.th string) can also be regulated to a desired value. This value can be, for example, equal to the difference between the power-converter-generated constant current and the sum of average currents in the other LED strings (e.g., N−1 LED strings). The control scheme can therefore exploit the disadvantage of the N-color LED strings having different string voltages in developing a simple, modular, and scalable control scheme to drive N-color LED systems.

FIG. 1A shows a block diagram of an LED driver system according to an embodiment of the subject invention. The system can be a scalable LED driver system and can be used for LED strings having different colors (i.e., it can be an N-color scalable LED driver system, where N is an integer such as an integer greater than one). Referring to FIG. 1A, the control scheme can control the power converter to produce a constant current ($i_L$). N-color LED strings with forward voltages $\{v_1, v_2 \ldots v_N\}$ can act as a load to the converter. The multi-color LED strings can be arranged such that $v_1 < v_2 < \ldots < v_N$. If these multi-color strings were connected to a single voltage source or current source without any control, then only the LED string with the lowest voltage would produce light output. These strings are controlled, though, by the control scheme in the driver system of the subject invention.

Figure 1B:
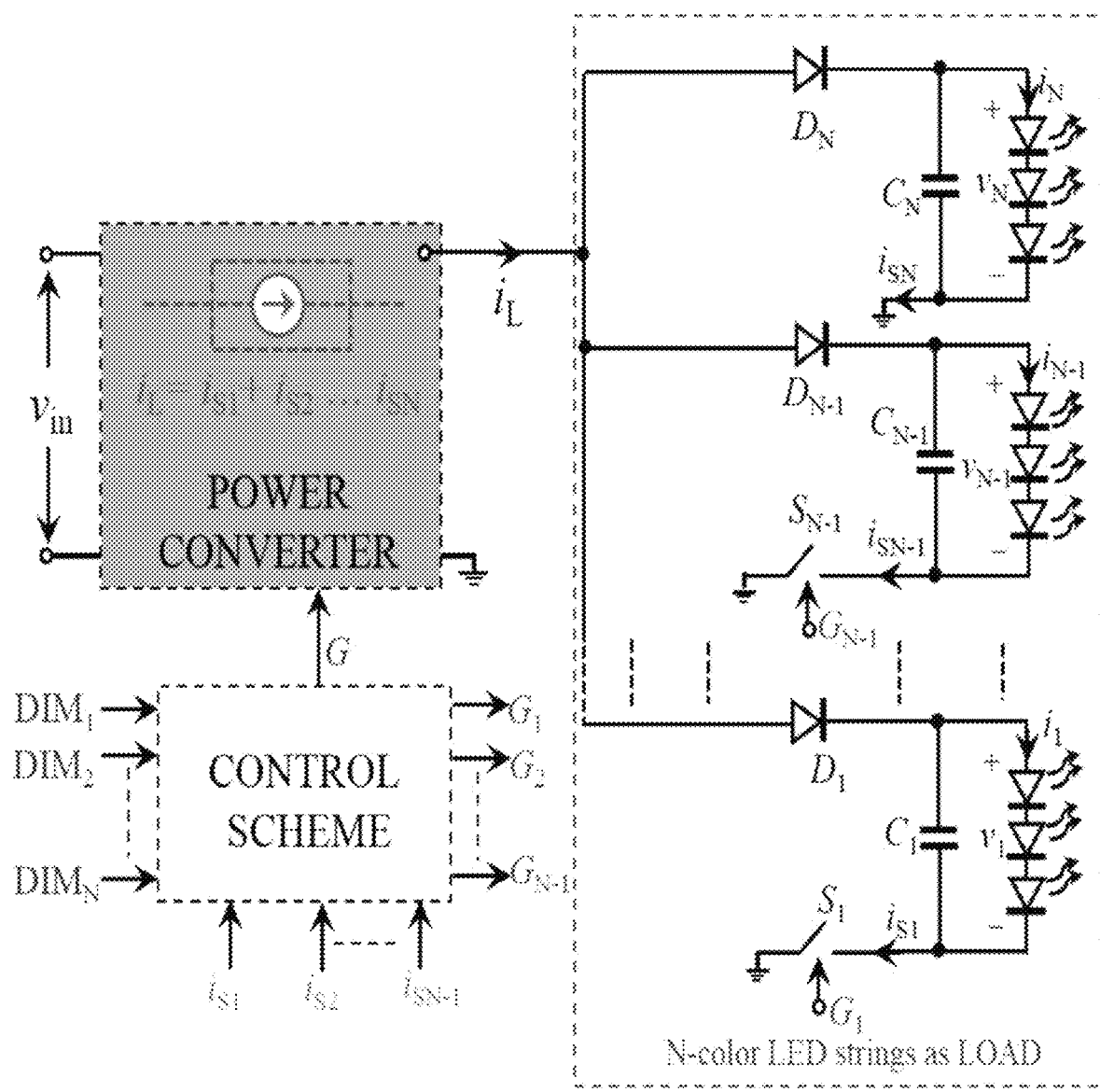
FIG. 1B shows a block diagram of an LED driver system according to an embodiment of the subject invention.

In an embodiment, independent current control for each color LED string can be achieved by connecting switches (e.g., a quantity of N−1 switches, where N is the total number of LED strings) $\{S_1, S_2 \ldots S_{N-1}\}$ in series with the strings, respectively (e.g., a quantity of N−1 strings). The system can be such that the string with the highest voltage ($v_N$) does not have a series switch. The switches $\{S_1, S_2 \ldots S_{N-1}\}$ can be placed in different positions, as long as each switch present is in series with an LED string. For example, FIG. 1B shows a block diagram of an LED driver system in which the switches are provided at a different position than they are in FIG. 1A. It is also possible to have a switch in different LED strings in positions within the string that are different from each other (e.g., some switches in a position similar to that shown in FIG. 1A and other in a position similar to that shown in FIG. 1B). Also, the switch positions shown in FIGS. 1A and 1B are for demonstrative purposes only; switches can be in other positions within the LED strings, as long as they are in series with the strings, respectively.

Figure 2:
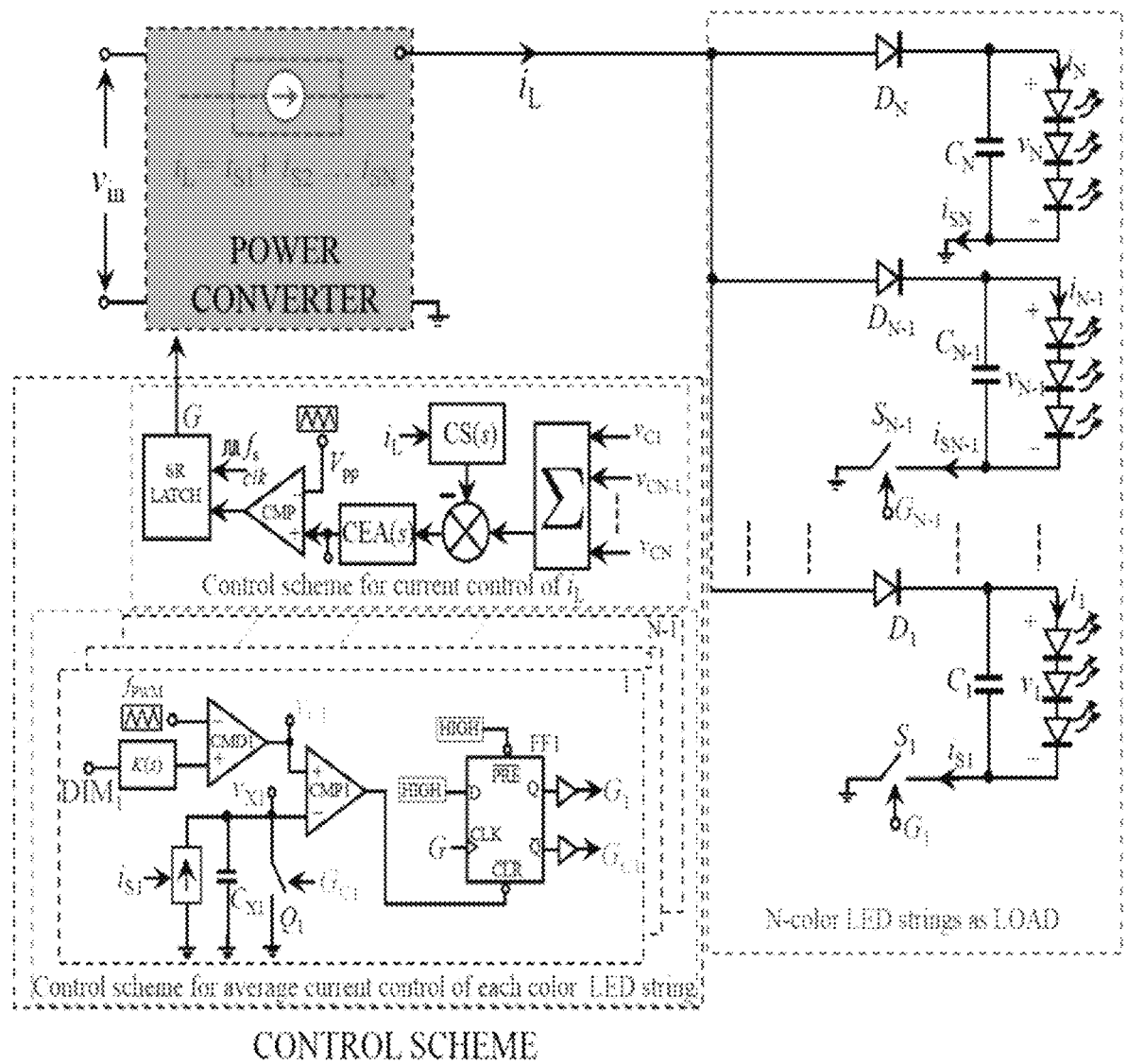
FIG. 2 shows a diagram of a control scheme according to an embodiment of the subject invention.
Figure 3:
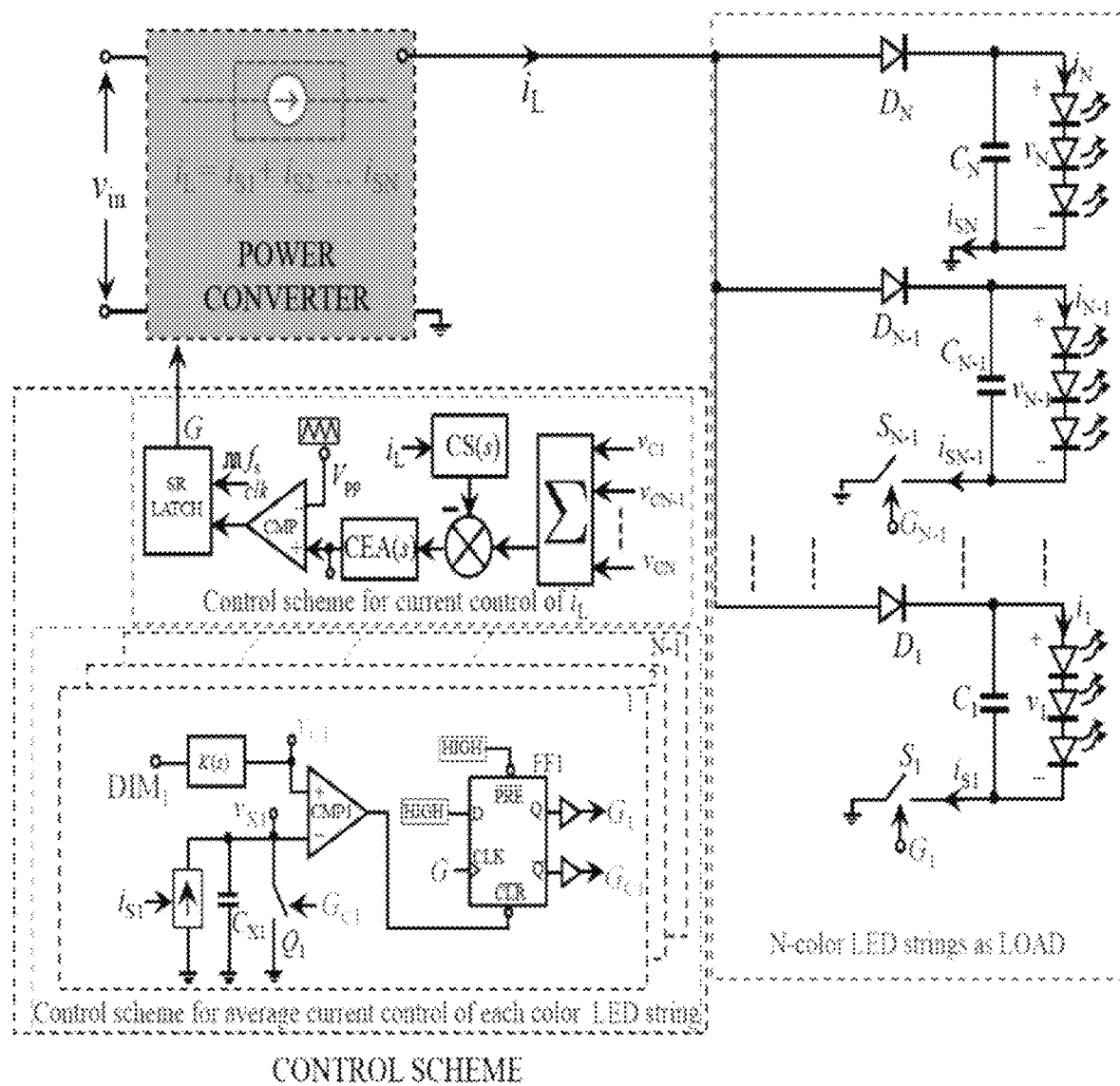
FIG. 3 shows a diagram of a control scheme according to an embodiment of the subject invention.

FIG. 2 shows a diagram of a control scheme implementation with PWM dimming. The control scheme can be used for controlling the power converter operating at switching frequency $f_s$ to realize a constant current $i_L$ equal to the sum of the desired currents in N strings. Referring to FIG. 2, each string current control can be achieved by using N−1 modular controllers. Illumination control signals $\{DIM_1, DIM_2 \ldots DIM_N\}$ can be used as inputs to the modular controller. Illumination control signals $\{DIM_1, DIM_2 \ldots DIM_N\}$ in an adaptive or dynamic lighting system can be obtained from, for example, ambient light or color sensors, and can be dependent on the control algorithm used. Using the illumination control signals, the control scheme can generate the control signals $\{v_{C1}, v_{C2} \ldots v_{CN}\}$ for different dimming techniques. The summation of the control signals $\{v_{C1}, v_{C2} \ldots v_{CN}\}$ can provide the desired reference value to control the power converter current ($i_L$). The reference for controlling the current ($i_L$) can be derived from illumination control signals $\{DIM_1 \ldots DIM_{N-1}, DIM_N\}$ based on the desired illumination levels for each color LED string. Illumination control can be performed by, for example, PWM dimming or analog dimming. FIG. 3 shows a diagram of a control scheme implementation for generation of control signals $\{v_{C1}, v_{C2} \ldots v_{CN}\}$ with analog dimming.

Figure 4:
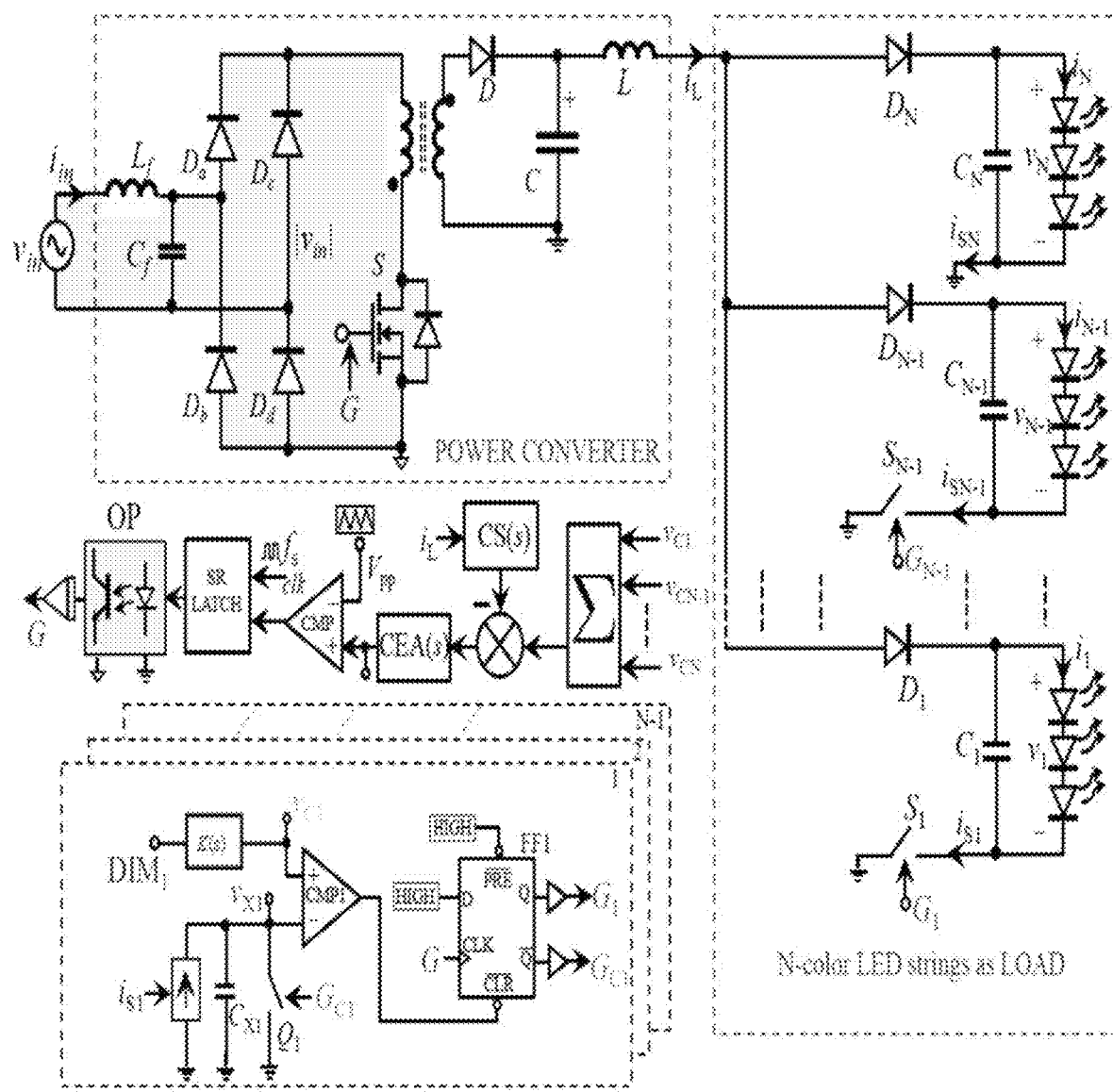
FIG. 4 shows a block diagram of an LED driver system according to an embodiment of the subject invention.
Figure 5:
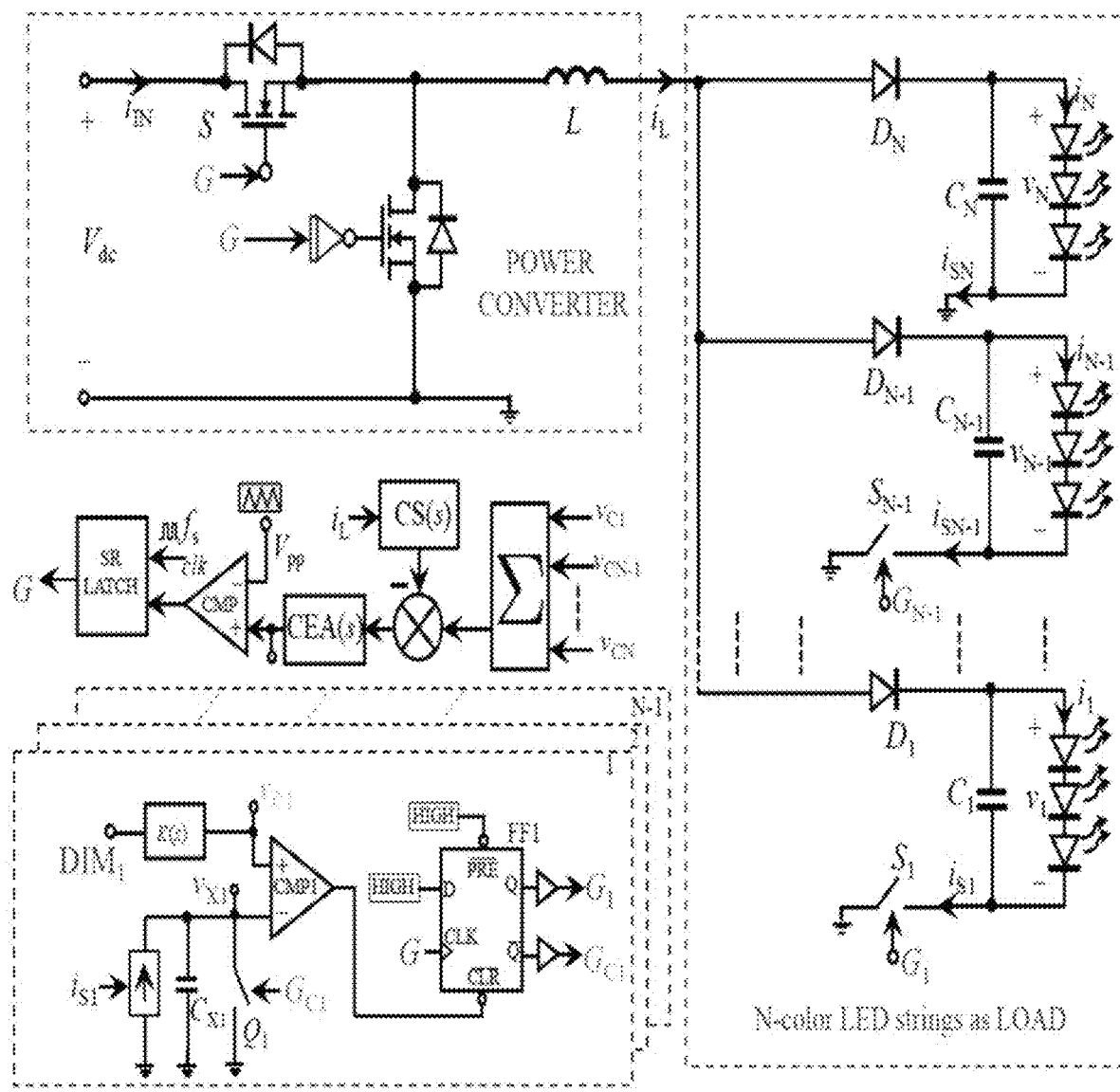
FIG. 5 shows a block diagram of an LED driver system according to an embodiment of the subject invention.

FIG. 4 shows a block diagram of an N-color LED driver system with an AC-DC power converter, according to an embodiment of the subject invention. This can be used when the input is AC. FIG. 5 shows a block diagram of an N-color LED driver system with a DC-DC power converter, according to an embodiment of the subject invention. This can be used when the input is DC. It is important to note that the power converter topologies shown in FIGS. 4 and 5 are for demonstrative purposes only. The AC-DC converter (for AC input) or DC-DC converter (for DC input) can be a converter of any topology that can provide a constant current.

Figure 6:
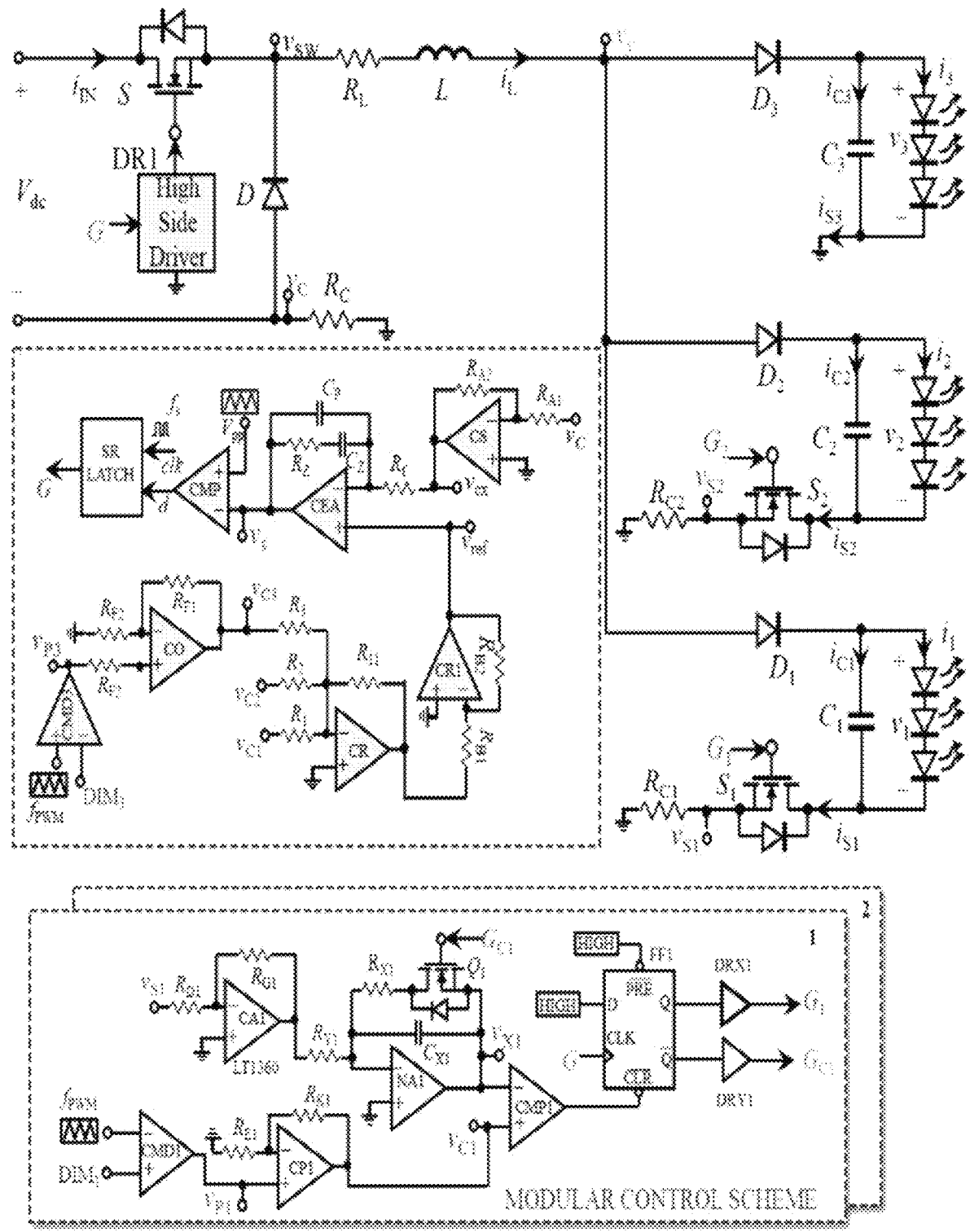
FIG. 6 shows a circuit diagram of an LED driver system according to an embodiment of the subject invention.

FIG. 6 shows a block diagram of an LED driver system for three LED strings of different colors (N=3). This system uses PWM dimming, though analog dimming could instead be used. The power converter topology used is a buck converter, though this is for demonstrative purposes only. The power converter when controlled with an average current mode control (as shown in FIG. 6) can produce a constant current. The current produced by the power converter can be shared among the three (N) strings using two (N−1) modular controllers. These controllers can monitor the currents $\{i_{S1}, i_{S2}\}$ flowing through the switches $\{S_1, S_2\}$, and they can be integrated to produce $v_{X1}, v_{X2}$. These voltages $v_{X1}, v_{X2}$ can be compared with the control signals $\{v_{C1}, v_{C2}\}$ to generate signals $\{G_1, G_2\}$ for sharing the current $i_L$ among two (N−1) strings (e.g., the strings other than that with the highest voltage). In steady state, the integrated switch current can be equal to the average current in the LED string, as the average current in the capacitors $C_1, C_2=0$. At the beginning of each switching cycle ($T_s$), the switches $\{S_1, S_2\}$ can be kept ON. This can be achieved with, for example, a simple logic by utilizing the power converter control signal 'G' as a clock to two (N−1) modular controller D-Flip Flops. Even though the switches $\{S_1, S_2\}$ are kept ON at the beginning of the switching cycle, the current ($i_{S1}$) will only flow in the LED string with the lowest voltage ($v_1$), and the currents ($i_{S2}, i_{S3}$) in the other strings will be zero (or approximately zero) at the very beginning of the cycle, as $v_1 < v_2 < v_3$, which makes the diodes $\{D_2, D_3\}$ reverse-biased. Once $v_{X1}$ reaches the reference value $v_{C1}$, the switch $S_1$ in that string can be switched OFF and the current can start flowing in that string with voltage $v_2 < v_3$. This process can continue thorough all strings. Therefore, if the average current in two (N−1) strings is controlled, then the average current in the third ($N^{th}$) string (e.g., that with the highest voltage) can also be regulated to the desired value as defined by the $v_0$ ($v_{CN}$). This is because $i_L$ is governed by $v_{C1}+v_{C2}+v_{C3}$ ($\Sigma v_{CN}$). In the system shown in FIG. 6, the control scheme has been implemented using mixed circuits (analog+digital). However, this is for demonstrative purposes only and the entire control can also be implemented using only digital controllers, such as microcontrollers and digital controllers, or only analog controllers.

Although FIG. 6 shows an LED driver system for driving three LED strings, this is for demonstrative purposes only. Systems and methods of the subject invention can be used to drive any number of LED strings, each of which can be for a different color LED. For example, N can be any of the following values, at least any of the following values, or at most any of the following values: 2, 3, 4, 5, 6, 7, 8, 9, 10, 11, 12, 13, 14, 15, 16, 17, 18, 19, or 20. N is preferably at least two.

In an embodiment, a method of fabricating an N-color LED driver system can include providing the components and assembling them to give a system as described herein.

In another embodiment, a method of driving an LED system having N strings of different color can include providing an N-color LED driver system as described herein and using the driver system for its intended purpose. The driver system can drive the LED system using a control scheme as described herein.

In another embodiment, a method of controlling an LED system having N strings of different color can include implementing a control scheme as described herein. The method can also include using an LED driver system as described herein to implement the control scheme.

Systems and methods of the subject invention allow for highly efficient, high-power-density multi-color LED systems to be designed at a reasonable cost. Due to the simplicity of the control schemes of the subject invention, the systems are suitable for IC implementation.

Systems and methods of the subject invention can also advantageously be used in smart lighting systems. Smart lighting systems that are adaptive in nature require high-quality, tunable white light with different correlated CTs, along with a black body curve and color-tunable light. High quality tunable white light is desired in general lighting to implement technologies like daylight harvesting in smart buildings. Color tunable light can be used for many applications, including accent lighting and plant growth lighting. Therefore, multi-color LED lighting systems with N-color LED strings are required for adaptive lighting. These N-color LED strings fundamentally have different forward voltages, as discussed herein, and the systems and methods of the subject invention can advantageously drive these multi-color LED lighting systems efficiently and at low cost.

Systems and methods of the subject invention can also be used for driving liquid crystal display (LCD) backlighting, organic LEDs (OLEDs), solar-powered LED lighting systems, driving and power on Ethernet (PoE) LED systems. In addition, they can be used for charging of batteries, fuel cells, super capacitors, or combinations of these devices that have different voltages, by using a single power source and a single inductor.

The systems, methods, and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLE 1

An LED driver system was fabricated for driving three LED strings of different colors (N=3). The system fabricated is shown in the block diagram of FIG. 6. The system was set up to use PWM dimming, and the power converter topology used was a buck converter. The current produced by the power converter was shared among the three (N) strings using two (N−1) modular controllers. These controllers monitored the currents $\{i_{S1}, i_{S2}\}$ flowing through the switches $\{S_1, S_2\}$, and they were integrated to produce $v_{X1}$, $v_{X2}$. These voltages $v_{X1}$, $v_{X2}$ were compared with the control signals $\{v_{C1}, v_{C2}\}$ to generate signals $\{G_1, G_2\}$ for sharing the current $i_L$ among two (N−1) strings (the strings other than that with the highest voltage). In steady state, the integrated switch current was equal to the average current in the LED string, as the average current in the capacitors $C_1$, $C_2$=0. At the beginning of each switching cycle ($T_s$), the switches $\{S_1, S_2\}$ were kept ON. This was achieved with a simple logic by utilizing the power converter control signal 'G' as a clock to two (N−1) modular controller D-Flip Flops. Even though the switches $\{S_1, S_2\}$ were kept ON at the beginning of the switching cycle, the current ($i_{S1}$) only flowed in the LED string with the lowest voltage ($v_1$), and the currents ($i_{S2}$, $i_{S3}$) in the other strings were zero (or approximately zero) at the very beginning of the cycle, as $v_1 < v_2 < v_3$, which made the diodes $\{D_2, D_3\}$ reverse-biased. Once $v_{X1}$ reached the reference value $v_{C1}$, the switch $S_1$ in that string was switched OFF and the current started flowing in that string with voltage $v_2 < v_3$. This process was repeated in the second string. After the average current in two (N−1) strings was controlled, then the average current in the third ($N^{th}$) string (that with the highest voltage) was also regulated to the desired value as defined by the v.sub.C3 ($v_{CN}$). This was because $i_L$ was governed by $v_{C1}+v_{C2}+v_{C3}$ ($\Sigma v_{CN}$). As seen in FIG. 6, the control scheme was implemented using mixed circuits (analog+digital).

Figure 7:
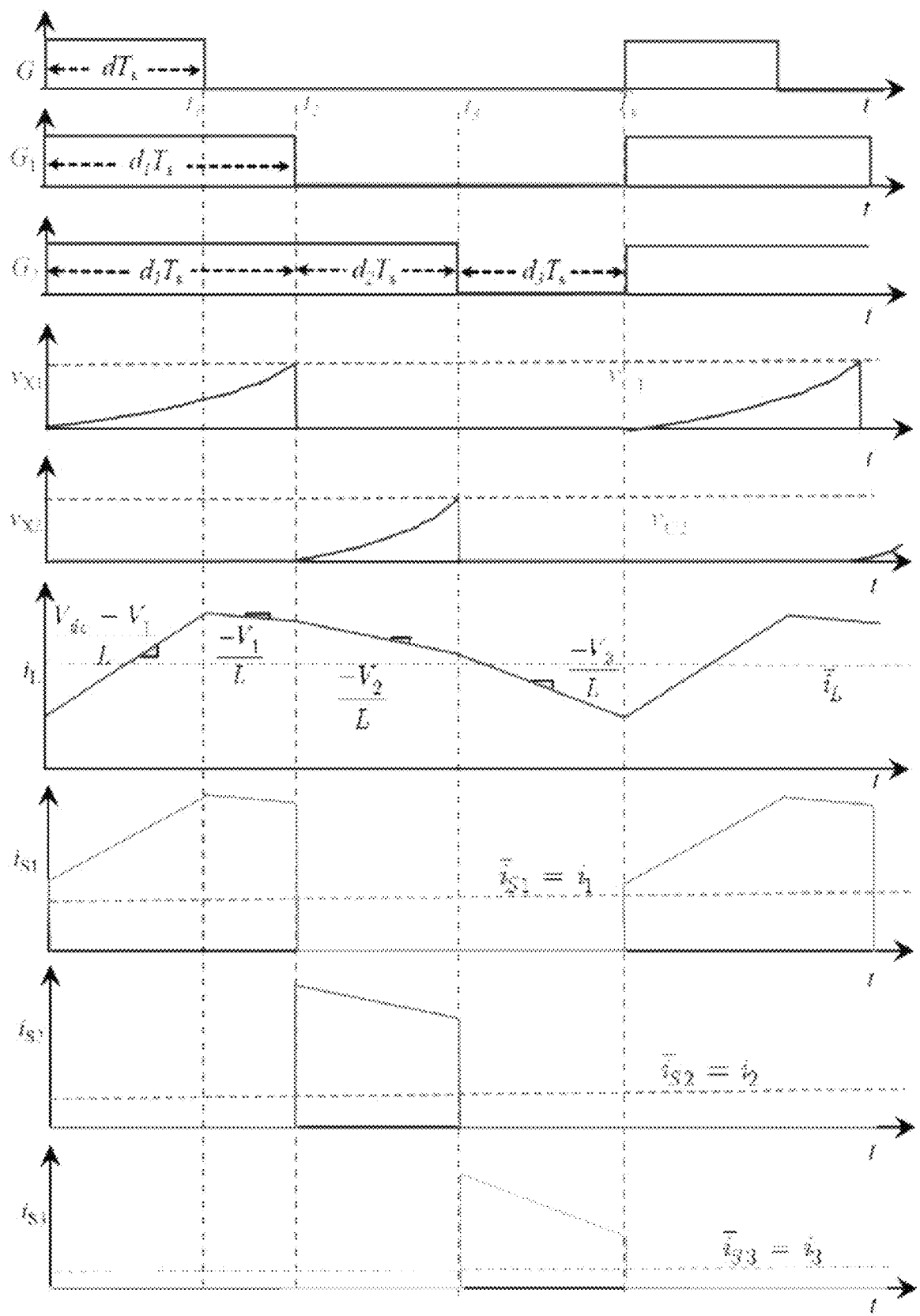
FIG. 7 shows steady state waveforms of inductor current and switch control signals for a system according to an embodiment of the subject invention.
Figure 8:
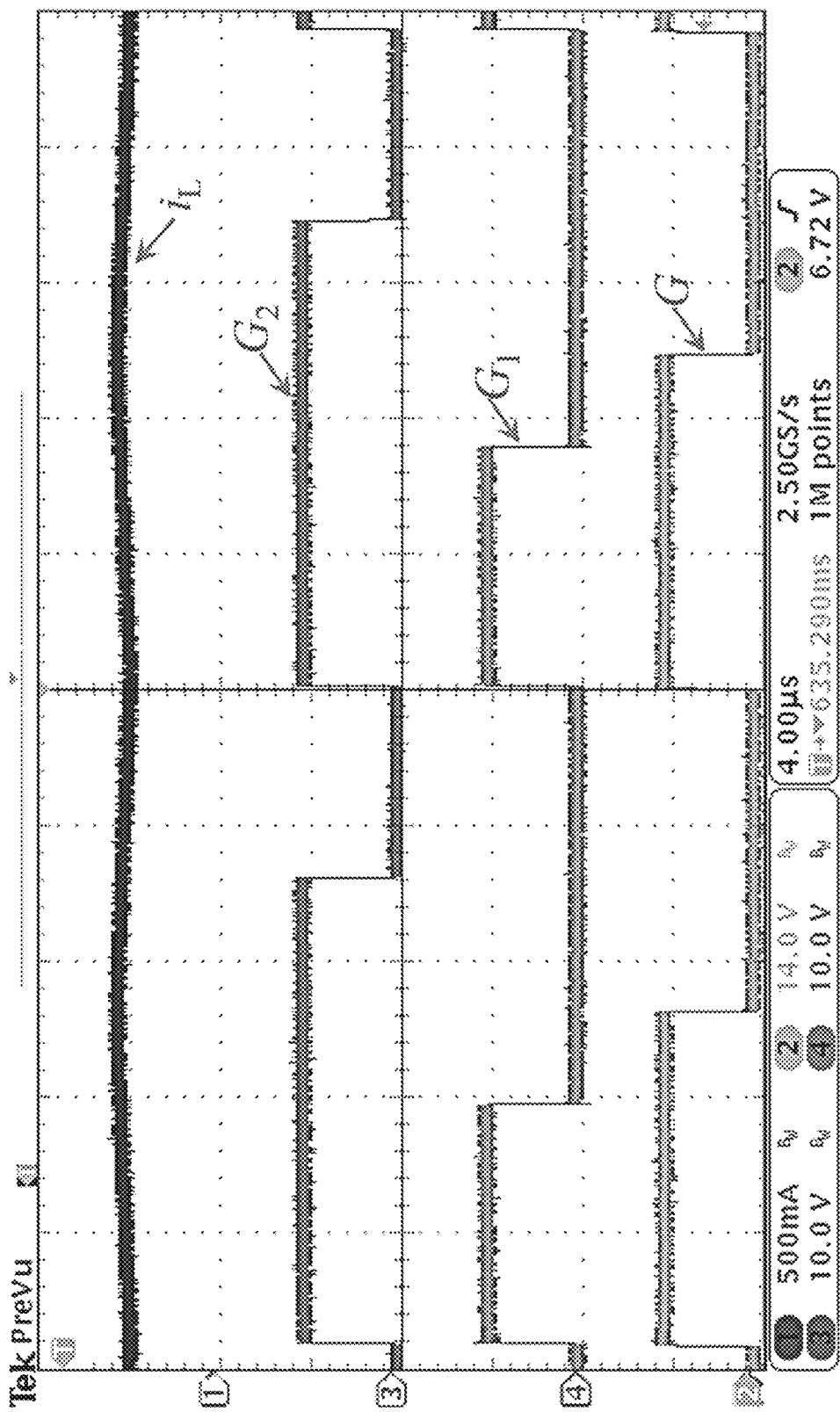
FIG. 8 shows waveforms of inductor current and control logic signals for a system according to an embodiment of the subject invention.
Figure 9:
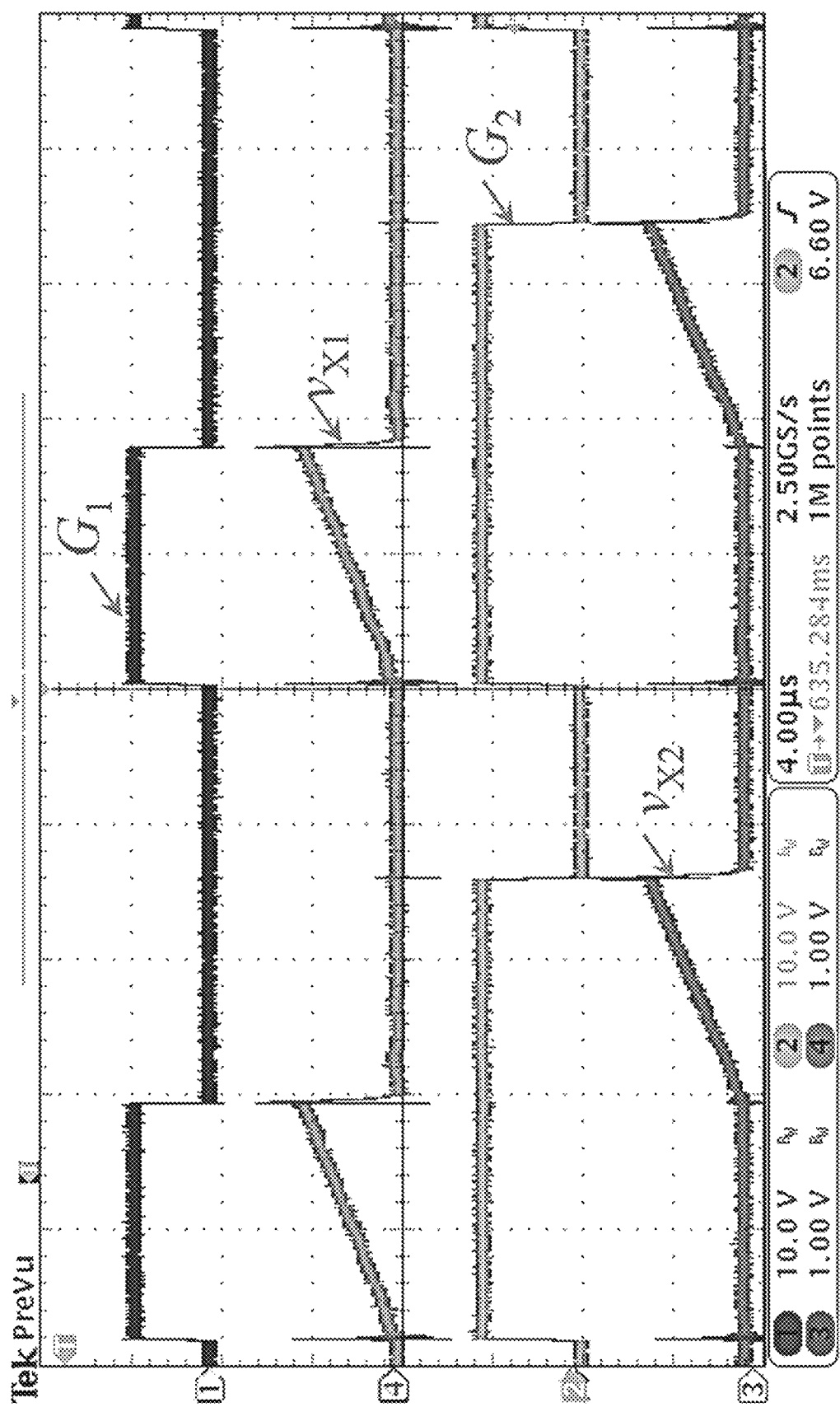
FIG. 9 shows waveforms of modulator controller voltages for a system according to an embodiment of the subject invention.
Figure 10:
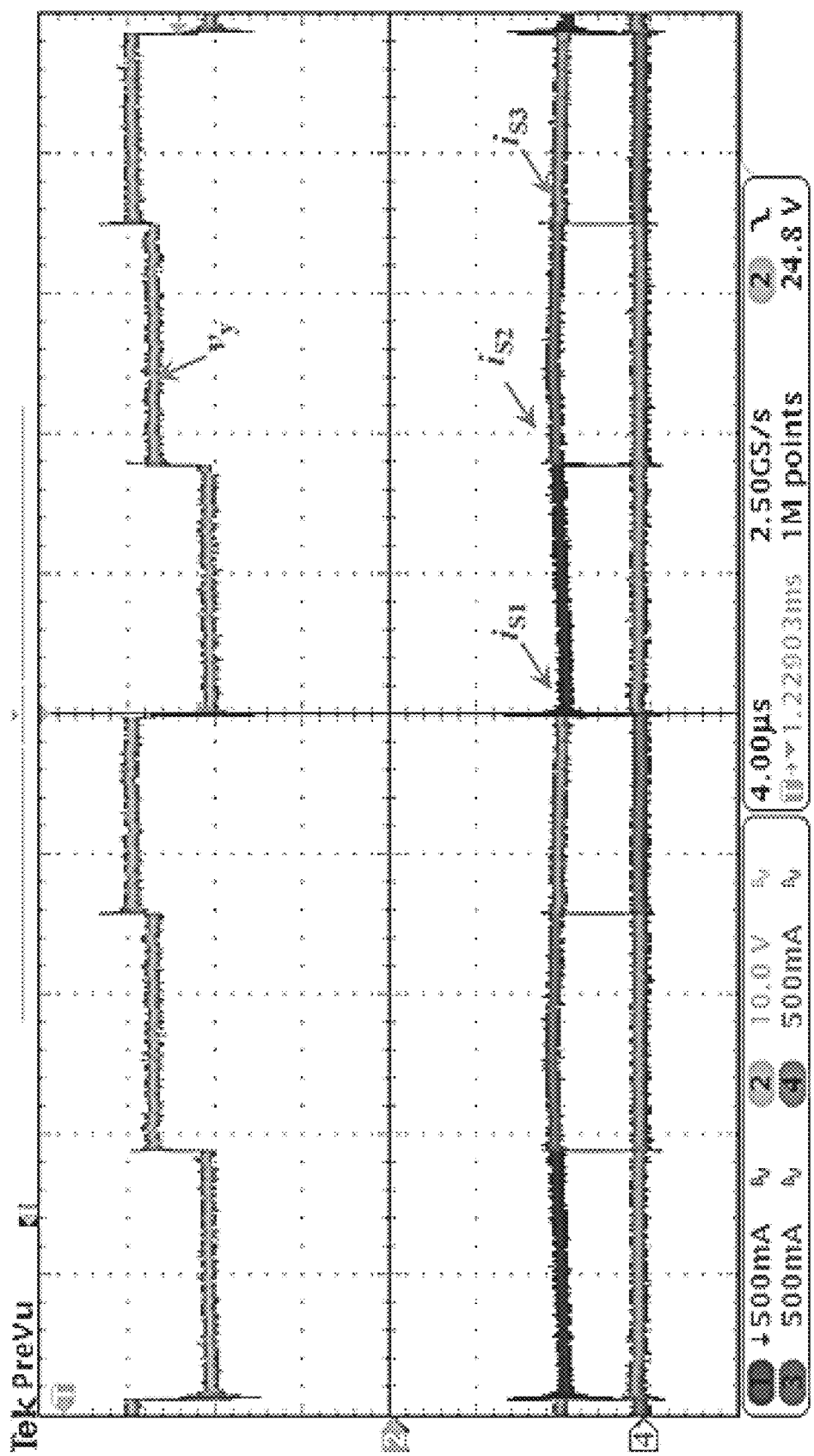
FIG. 10 shows waveforms of diode currents and node voltage for a system according to an embodiment of the subject invention.
Figure 11:
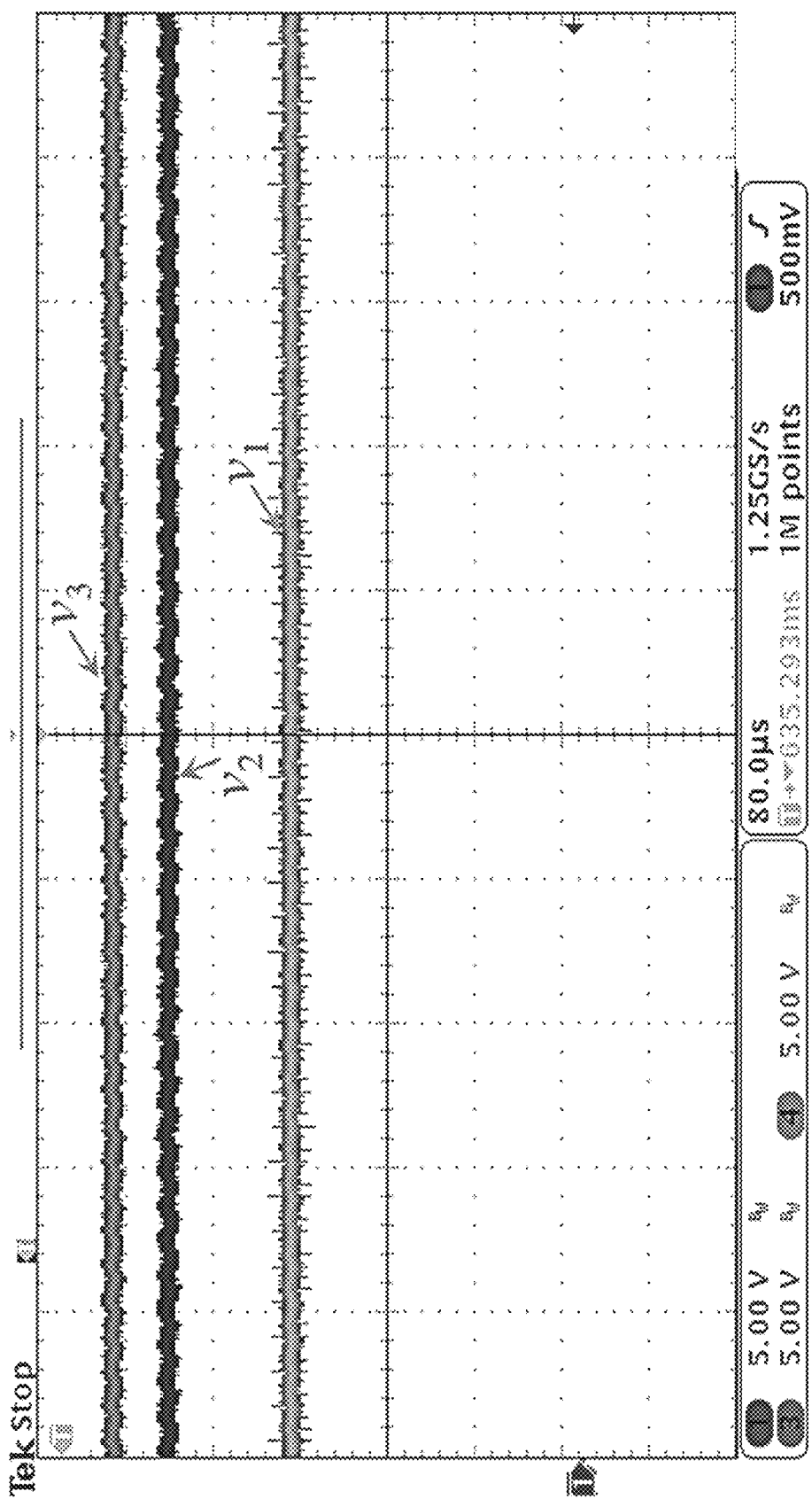
FIG. 11 shows waveforms of LED string voltages for a system according to an embodiment of the subject invention.
Figure 12:
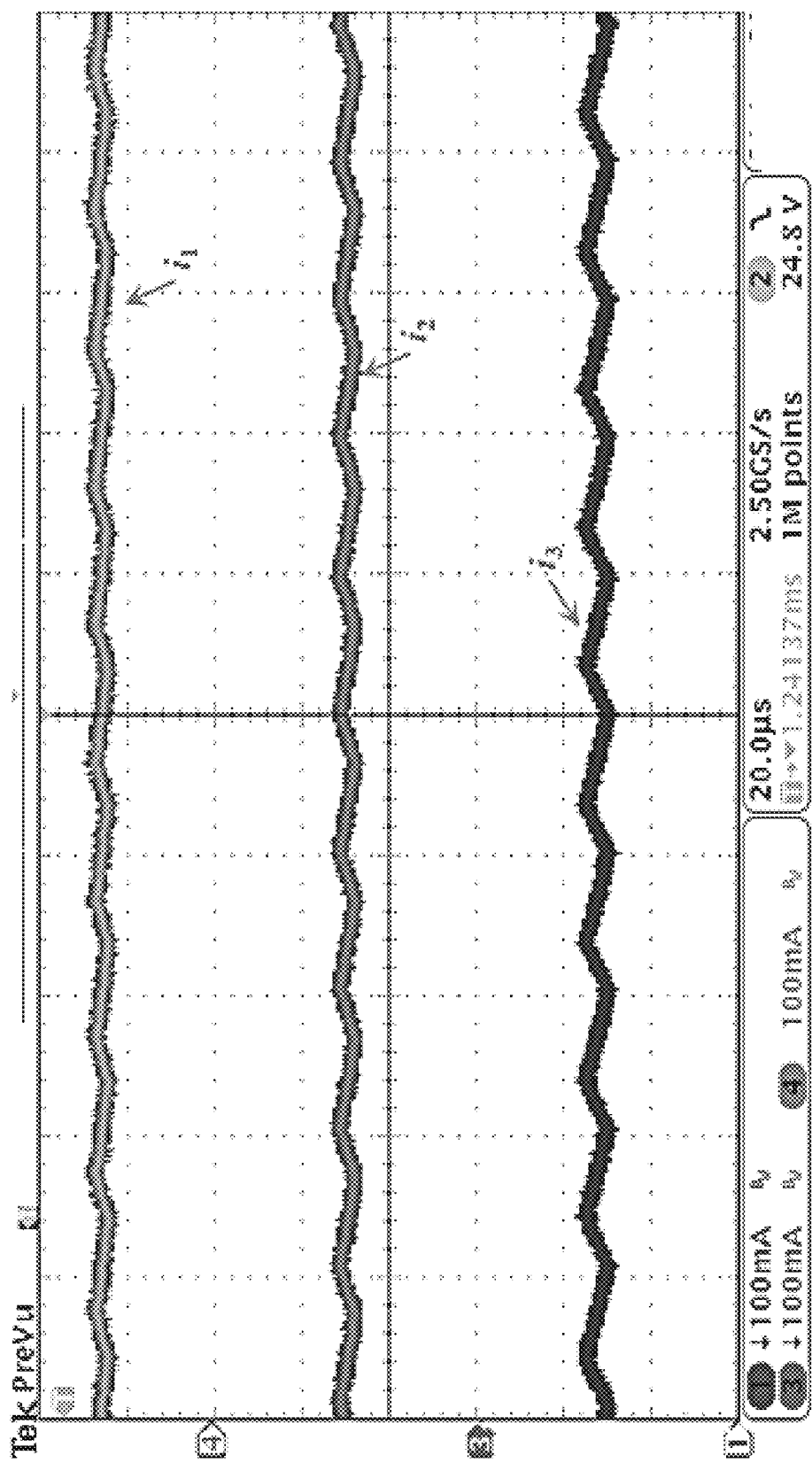
FIG. 12 shows waveforms of LED string currents for a system according to an embodiment of the subject invention.
Figure 13:
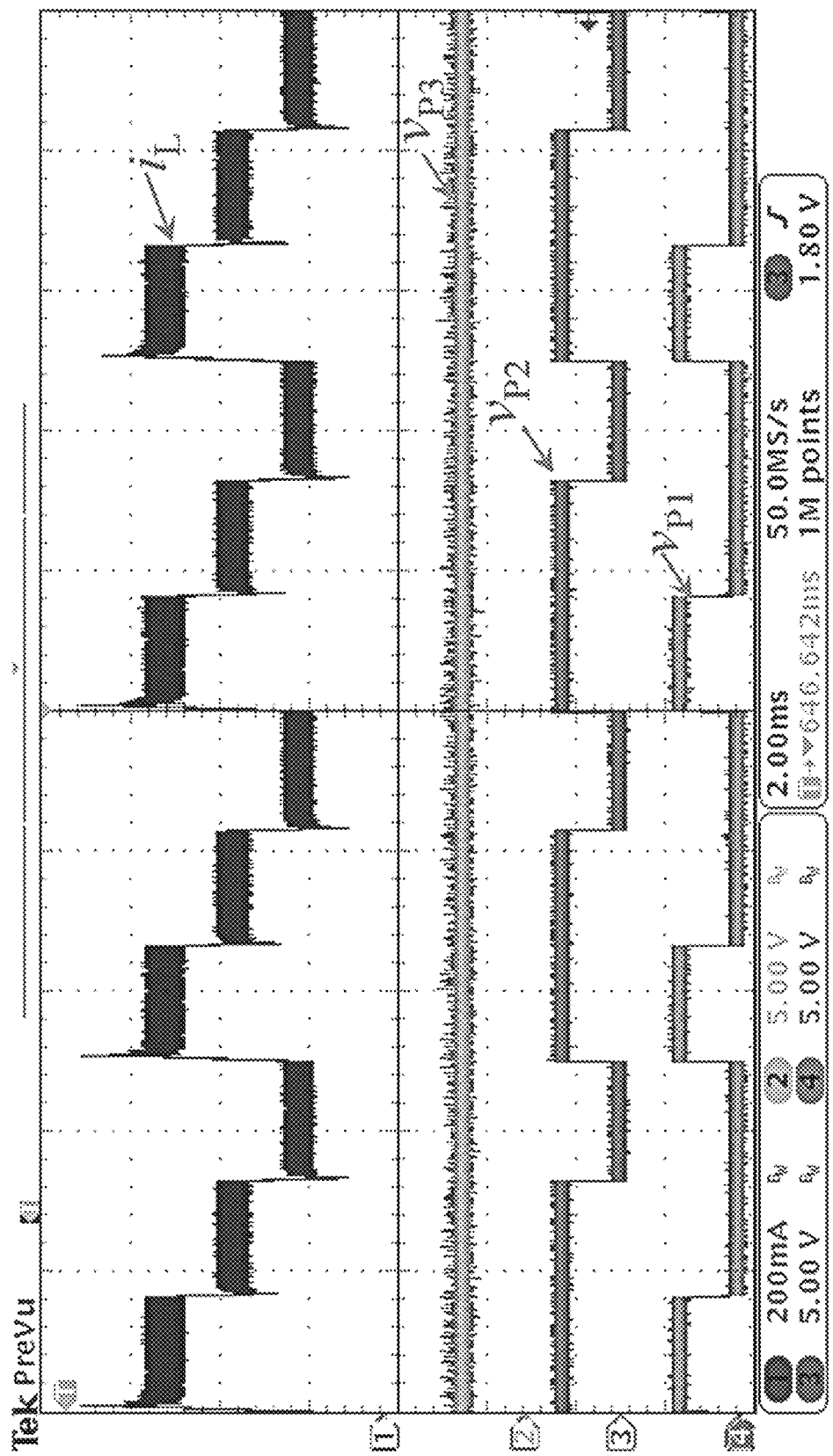
FIG. 13 shows waveforms of inductor current and control signals for a system according to an embodiment of the subject invention.

This (N=3)-color LED driver system was tested to determine parameters of the system. FIG. 7 shows the steady state waveforms for this system. FIG. 8 shows experimental waveforms of inductor current ($i_L$) and control logic signals $G_1$, $G_2$, and G for $S_1$, $S_2$, and S, respectively. FIG. 9 shows experimental waveforms of modulator controller voltages $v_{X1}$, V with respect to the control signals $G_1$ and $G_2$. FIG. 10 shows experimental waveforms of the node voltage $v_y$ and of the currents $i_{S1}$, $i_{S2}$, $i_{S3}$ in the diodes $D_1$, $D_2$, $D_3$, respectively. FIG. 11 shows experimental waveforms of the LED string voltages $v_1$, $v_2$, $v_3$. FIG. 12 shows experimental waveforms of the LED string currents $i_1$, $i_2$, $i_3$. FIG. 13 shows experimental waveforms of inductor current ($i_L$) of control signals $v_{p1}$, $v_{p2}$, $v_{p3}$ to strings 1, 2, and 3 with 33%, 66% and 100% PWM dimming, respectively.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A light-emitting diode (LED) driving system, comprising:
    a power converter comprising an inductor and configured to provide a direct current (DC) output;
    a control circuit configured to receive input signals and provide output control signals to the power converter; and
    a load connected to the power converter and receiving the DC output from the power converter,
    wherein the load comprises:
        a first LED string for a first LED of a first color; and
        a second LED string for a second LED of a second color different from the first color,
    wherein the first LED is a higher-voltage LED than is the second LED, and
    wherein the second LED string comprises a first switch in series with the second LED; and wherein the controller is configured to implement a control scheme comprising the following steps:
i) setting all switches in the strings ON;
ii) measuring individual switch currents for all switches in the strings;
iii) integrating these switch currents;
iv) once an integrated current in the LED string that has the lowest-voltage LED of all present current strings that have a switch that is ON reaches a predetermined reference value for that LED string, switching the switch in that LED string to OFF;
v) repeating step iv) until all series switches in the strings are OFF.

2. The LED driving system according to claim 1, wherein the load further comprises at least one additional LED string, wherein each additional LED string includes an LED of a color that is different from that of the LED of all other additional LED strings and also different from the first and second colors,
wherein the LED of each additional LED string is a lower-voltage LED than is the first LED, and
wherein each additional LED string further includes a switch in series with the LED of each additional LED string.

3. The LED driving system according to claim 1, wherein the predetermined reference value is set for each LED string individually.

4. The LED driving system according to claim 1, wherein the first LED string is regulated by the control scheme to a predetermined reference value for the first LED string, and wherein the predetermined reference value for the first LED string is equal the difference between the power-converter-generated constant current and the sum of average currents in all other LED strings.

5. The LED driving system according to claim 1, wherein the first LED string does not include a switch in series with the first LED.

6. The LED driving system according to claim 1, wherein the control scheme further comprises:
vi) repeating steps i)-v) each switching cycle ($T_s$),
wherein the switching cycle ($T_s$) is a length of time equal to the inverse of a switching frequency ($f_s$) of the power converter.

7. The LED driving system according to claim 1, wherein the input signals received by the controller are illumination control signals
wherein the illumination control signals are obtained from ambient light, at least one color sensor, or both,
wherein a reference value for the power-converter-generated constant current is derived from the illumination control signals based on desired illumination levels for each LED string present, and
wherein illumination control within the controller is performed by pulse-width modulation (PWM) dimming or analog dimming.

8. The LED driving system according to claim 1, wherein a reference value for the power-converter-generated constant current is based on a summation of the output control signals from the controller.

9. The LED driving system according to claim 1, wherein the load is connected in parallel with the power converter.

10. The LED driving system according to claim 1, wherein the power converter is an alternating current-DC (AC-DC) power converter configured to receive an AC input.

11. The LED driving system according to claim 1, wherein the power converter is a DC-DC power converter configured to receive a DC input.

12. The LED driving system according to claim 1, wherein the power converter is a buck converter.

13. The LED driving system according to claim 1, wherein the power converter includes exactly one inductor.

* * * * *